United States Patent
Nagaya et al.

(10) Patent No.: US 10,944,125 B2
(45) Date of Patent: Mar. 9, 2021

(54) PRODUCTION METHOD FOR LITHIUM-ION SECONDARY BATTERY

(71) Applicant: TOYOTA JIDOSHA KABUSHIKI KAISHA, Toyota (JP)

(72) Inventors: Katsuhiko Nagaya, Toyota (JP); Shinobu Okayama, Miyoshi (JP); Kyoko Kikuchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 15/709,066

(22) Filed: Sep. 19, 2017

(65) Prior Publication Data

US 2018/0108933 A1 Apr. 19, 2018

(30) Foreign Application Priority Data

Oct. 17, 2016 (JP) .............................. JP2016-203596

(51) Int. Cl.
| | |
|---|---|
| *H01M 10/04* | (2006.01) |
| *H01M 10/0585* | (2010.01) |
| *H01M 10/44* | (2006.01) |
| *H01M 10/0525* | (2010.01) |
| *H01M 10/0587* | (2010.01) |

(52) U.S. Cl.
CPC ..... *H01M 10/049* (2013.01); *H01M 10/0525* (2013.01); *H01M 10/0585* (2013.01); *H01M 10/0587* (2013.01); *H01M 10/44* (2013.01); *H01M 10/446* (2013.01); *H01M 2220/20* (2013.01); *Y02E 60/10* (2013.01); *Y02T 10/70* (2013.01)

(58) Field of Classification Search
CPC ... H01M 10/049; H01M 10/44; H01M 10/446
See application file for complete search history.

(56) References Cited

U.S. PATENT DOCUMENTS

| | | | |
|---|---|---|---|
| 2002/0055047 A1* | 5/2002 | Satoh ................ | H01M 10/0525 429/337 |
| 2014/0028264 A1 | 1/2014 | Taniyama et al. | |
| 2016/0268626 A1* | 9/2016 | Ishida ..................... | H01M 2/36 |
| 2016/0294017 A1 | 10/2016 | Ebisuzaki et al. | |

FOREIGN PATENT DOCUMENTS

| | | | | |
|---|---|---|---|---|
| JP | 08190934 A | 7/1996 | | |
| JP | 2010225394 A | 10/2010 | | |
| JP | 2016091613 A | 5/2016 | | |
| JP | 2016-195044 A | 11/2016 | | |
| WO | 2012/124211 A1 | 9/2012 | | |
| WO | WO-2015064060 A1 * | 5/2015 | .............. | H01M 2/36 |
| WO | 2015118857 A1 | 8/2015 | | |

* cited by examiner

*Primary Examiner* — James Lee
(74) *Attorney, Agent, or Firm* — Sughrue Mion, PLLC

(57) ABSTRACT

A production method for a lithium-ion secondary battery includes configuring an electrode group provided with a positive electrode and a negative electrode, storing the electrode group, electrolytic solution, and a third electrode in a housing, charging the negative electrode by performing charging between the third electrode and the negative electrode inside the housing, and discharging the charged negative electrode by performing discharging between the third electrode and the negative electrode, thereby producing the lithium-ion secondary battery.

8 Claims, 12 Drawing Sheets

PRODUCTION METHOD FOR LITHIUM-ION SECONDARY BATTERY

INCORPORATION BY REFERENCE

The disclosure of Japanese Patent Application No. 2016-203596 filed on Oct. 17, 2016 including the specification, drawings and abstract is incorporated herein by reference in its entirety.

BACKGROUND

1. Technical Field

The disclosure relates to a production method for a lithium-ion secondary battery.

2. Description of Related Art

WO 2012/124211 discloses a method for recovering a capacity of a lithium-ion secondary battery by connecting a lithium-ion supplying electrode and a positive electrode with each other, and supplying lithium ion to the positive electrode from the lithium-ion supplying electrode.

SUMMARY

In a lithium-ion secondary battery, its usable capacity decreases gradually as the battery is charged and discharged repeatedly. One of the reasons of such a capacity decrease is generation of inactive lithium (also referred to as "dead lithium"). Inactive lithium does not contribute to charge and discharge reactions. Therefore, a usable capacity decreases by an amount of inactive lithium generated.

WO 2012/124211 discloses a lithium-ion secondary battery that includes a lithium-ion supplying electrode (a third electrode), which is not used during ordinary charge and discharge, in addition to a positive electrode and a negative electrode, which are used during ordinary charge and discharge. In this lithium-ion secondary battery, when inactive lithium is generated, lithium ion is supplied to the positive electrode from the lithium-ion supplying electrode. Thus, a reduced capacity is recovered. Hereinafter, processing for recovering a capacity by using a third electrode is referred to as "recovery processing".

The recovery processing is carried out by connecting a third electrode with a positive electrode. In this case, a potential difference between the third electrode and the positive electrode serves as driving force for the recovery processing. The recovery processing takes longer compared to ordinary charge that is carried out by supplying power from outside.

Therefore, the disclosure provides a lithium-ion secondary battery in which time required for the recovery processing is shortened.

Hereinafter, technical construction and effects of the disclosure are explained. However, an operation mechanism of this disclosure includes supposition. The scope of the disclosure should not be limited depending on the correctness of the operation mechanism.

A production method for a lithium-ion secondary battery according to an aspect of the disclosure includes configuring an electrode group provided with a positive electrode and a negative electrode, storing the electrode group, electrolytic solution, and a third electrode in a housing, charging the negative electrode by performing charging between the third electrode and the negative electrode inside the housing, and discharging the charged negative electrode by performing discharging between the third electrode and the negative electrode, thereby producing the lithium-ion secondary battery. The positive electrode faces the negative electrode in the electrode group. The negative electrode is provided with a non-facing region that does not face the positive electrode. The third electrode is arranged so as to face the non-facing region.

The electrode group is provided with the positive electrode and the negative electrode that are used for ordinary charging and discharging. The third electrode is a lithium-ion supplying electrode that is not used for the ordinary charging and discharging. In the viewpoint of material cost, the positive electrode may not include a non-facing region that does not face the negative electrode. In a case where the positive electrode does not include the non-facing region, in other words, when the positive electrode is covered with the negative electrode, the negative electrode includes the non-facing region that does not face the positive electrode. In this case, since the positive electrode is covered with the negative electrode, it is difficult to arrange the third electrode near the positive electrode. When the third electrode is located away from the positive electrode, it is considered that it takes long to supply lithium ion to the positive electrode from the third electrode.

Therefore, in the lithium-ion secondary battery produced by using the production method according to the aspect of the disclosure, lithium ion is supplied to the positive electrode from the third electrode through the non-facing region of the negative electrode. This means that the third electrode is arranged so as to face the non-facing region of the negative electrode. The non-facing region of the negative electrode does not face the positive electrode. Therefore, it is possible to arrange the third electrode adjacent to the non-facing region. In this configuration, it is considered that, once the third electrode is connected with the positive electrode through an external circuit, lithium ion is first supplied from the third electrode to the non-facing region of the negative electrode, and then lithium ion is supplied from the negative electrode to the positive electrode. In the electrode group, since a part that receives lithium ion is close to the third electrode, it is considered that time required for the recovery processing is shortened.

However, the non-facing region of the negative electrode is not used for ordinary charging and discharging. Therefore, the non-facing region of the negative electrode receives lithium ion for the first time during the recovery processing. This means that the non-facing region of the negative electrode is charged for the first time by the recovery processing. At the first charging of the negative electrode, an irreversible capacity is generated. An irreversible capacity is a part of a capacity supplied to the negative electrode by charging, and this part of the capacity cannot be returned to the positive electrode.

A film is formed by reductive decomposition of electrolytic solution. This film is also referred to as an SEI (solid electrolyte interface). It is considered that an irreversible capacity derives from lithium ion that is taken into the film during the first charging. It is said that the film formed during the first charging has an effect of suppressing reductive decomposition of electrolytic solution, and thus stabilizes a charging reaction during the second or subsequent charging. Therefore, in the second or subsequent charging, an amount of an irreversible capacity generated is small.

When the film is formed during the recovery processing, lithium ion is taken into the film, and a part of lithium ion released from the third electrode is thus lost. Because of this, it is considered that it takes long to supply a given amount of lithium ion to the positive electrode. Therefore, in the production method according to this disclosure, the negative electrode is charged by preforming charging between third electrode and the negative electrode inside the housing, and the charged negative electrode is discharged by performing discharging between the third electrode and the negative electrode, thereby producing the lithium-ion secondary battery. Thus, as stated above, when the lithium-ion secondary battery is produced, charging and discharging are carried out between the third electrode and the negative electrode. As a result, the film is formed in the non-facing region in advance.

In the lithium-ion secondary battery produced by using the production method according to the aspect of the disclosure, the recovery processing serves as the second or subsequent charging for the non-facing region. Therefore, during the recovery processing, an amount of lithium ion lost due to forming of the film is small. Therefore, it is considered that time required for the recovery processing is shortened.

In the aspect of the disclosure, the electrode group may be a wound electrode group that is structured by winding the positive electrode and the negative electrode. The non-facing region may be arranged on an outermost periphery of the wound electrode. By arranging the non-facing region on the outermost periphery, it is possible to supply lithium ion efficiently to the non-facing region from the third electrode.

In the aspect of the disclosure, the electrode group may be a laminated electrode group that is structured by laminating the positive electrode and the negative electrode alternately. The non-facing region may be arranged on an outermost layer of the laminated electrode group. By arranging the non-facing region on the outermost layer, it is possible to supply lithium ion efficiently to the non-facing region from the third electrode.

In the aspect of the disclosure, the positive electrode may have a first charge and discharge capacity per unit area. The third electrode may have a second charge and discharge capacity per unit area. The second charge and discharge capacity may be at least twice as large as the first charge and discharge capacity. Because of this, even if an irreversible capacity is generated due to charging and discharging between the third electrode and the negative electrode, the third electrode is able to maintain sufficient lithium ion for the recovery processing.

In the aspect of the disclosure, when a current rate, with which a state of charge of the lithium-ion secondary battery reaches 100% from 0% in an hour-long charging, is defined as 1 C, the negative electrode may be charged with a current rate of 1 C or larger but not exceeding 2 C. The negative electrode may be discharged with a current rate of 1 C or larger but not exceeding 2 C. When a current rate during charging exceeds 2 C, charging only requires a short period of time. However, uniformity of the film can be deteriorated. When uniformity of the film is reduced, it is possible that the film is formed again (loss of lithium-ion happens) during the recovery processing in a portion where the film was not formed sufficiently. When a current rate during charging is smaller than 1 C, it is considered that uniformity of the film improves. However, processing times becomes long, which is considered inefficient. When a current rate during discharging exceeds 2 C, an amount of lithium ion returning to the third electrode can be reduced. When the amount of lithium ion returning to the third electrode is reduced, an excessive amount of lithium ion is present in the electrode group, which could cause, for example, a voltage defect. When a current rate during discharging is smaller than 1 C, processing time becomes long, which is considered inefficient.

The state of charge (hereinafter, also referred to as "SOC") shows a ratio of a current charge capacity with respect to a full charge capacity of the lithium-ion secondary battery.

In the lithium-ion secondary battery according to the aspect of the disclosure, a capacity equivalent to a state of charge of 40% or larger but not exceeding 60% may be charged in the negative electrode. As the capacity equivalent to a state of charge (SOC) of 40% or larger is charged in the negative electrode, the film is formed sufficiently. It is considered that this suppresses generation of an irreversible capacity during the recovery processing. A capacity equivalent to SOC exceeding 60% may be charged to the negative electrode. However, in a region where SOC exceeds 60%, an amount of the film formed (an amount of the irreversible capacity generated) is small. Therefore, it is considered that effect of shortening time for the recovery processing does not improve so much.

In the lithium-ion secondary battery according to the aspect of the disclosure, the electrode group may be provided with a positive electrode and a negative electrode that are used for ordinary charging and discharging, and the third electrode may be a lithium-ion supplying electrode that is not used during the ordinary charging and discharging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure (hereinafter, referred to as "this embodiment") is explained. However, the scope of the disclosure should not be limited to the explanation below. Hereinafter, the lithium-ion secondary battery is simply referred to as a "battery" in some instances.

Figure 1:
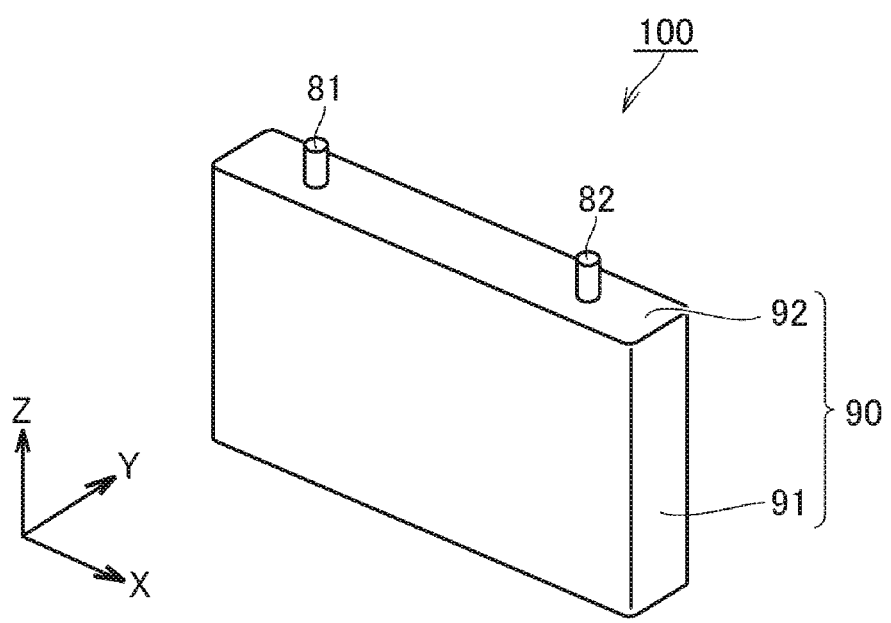
FIG. 1 is a schematic view of an example of a configuration of a lithium-ion secondary battery according to an embodiment of the disclosure.

<Lithium-ion secondary battery> First of all, explanation is given regarding an outline of a lithium-ion secondary battery, which is produced by a production method for a lithium-ion secondary battery according to this embodiment. FIG. 1 is a schematic view of an example of a configuration of the lithium-ion secondary battery according to this embodiment. A battery 100 includes a housing 90. The housing 90 has a rectangular shape (flat rectangular parallelepiped shape). However, the housing in this embodiment may also have a cylindrical shape. Typically, the housing 90 is made of metal such as pure aluminum (Al), Al alloy, and stainless steel. However, as long as the housing 90 has given sealability, the housing 90 may be made of resin or a composite material of metal and resin. For example, as the composite material of metal and resin, an aluminum laminated film may be used.

The housing 90 includes a case 91 and a lid 92. The case 91 has a bottom, side walls, and an opening. The side walls are continuous from the bottom. The opening is located on the opposite side of the bottom. The opening is closed by the lid 92. The lid 92 is joined to the case 91 by, for example, laser welding. The lid 92 includes a positive electrode terminal 81 and a negative electrode terminal 82. The lid 92 may also be provided with a safety valve, a liquid injection hole (both are not shown) and so on.

Figure 2:
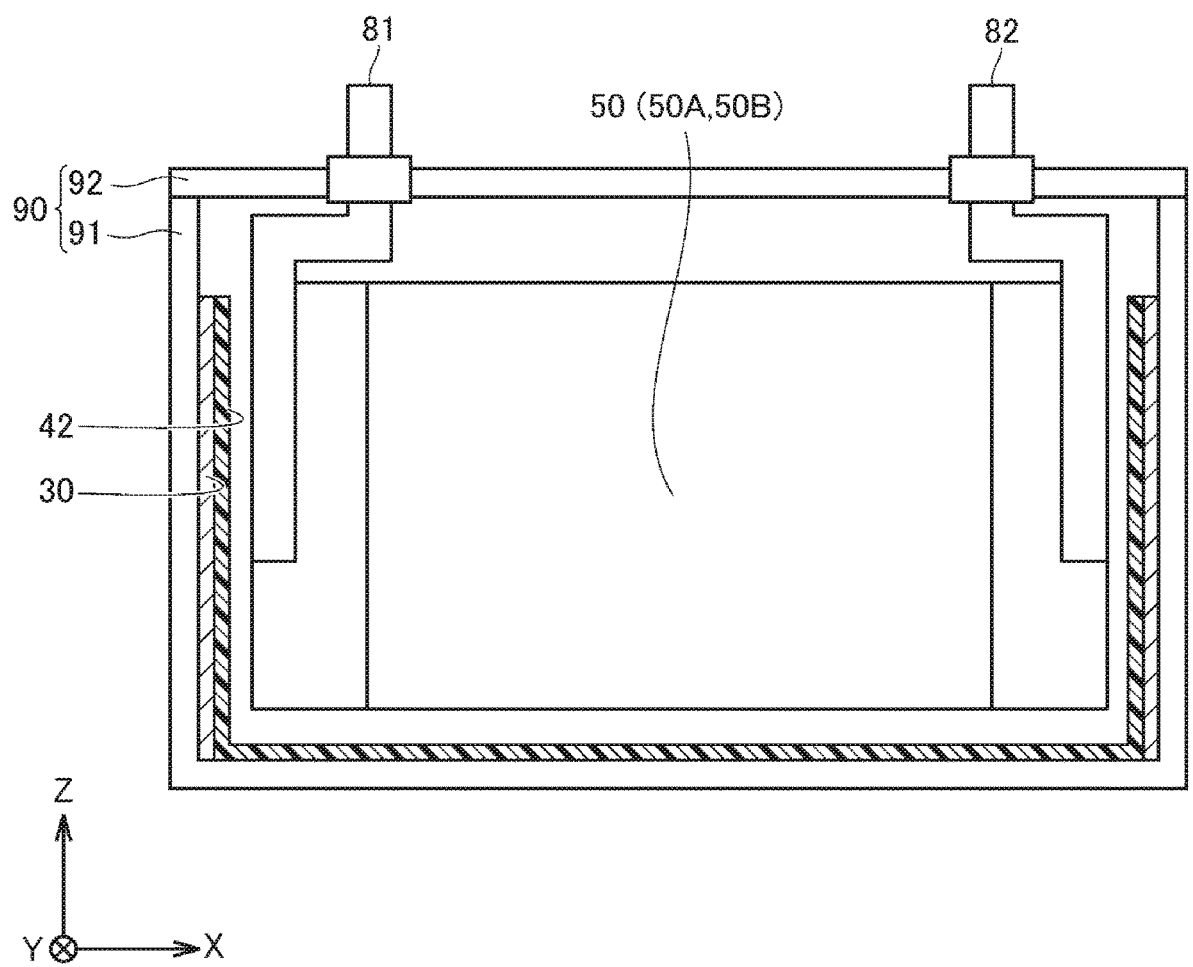
FIG. 2 is an example of a schematic sectional view parallel to an XZ plane in FIG. 1.

FIG. 2 is an example of a schematic sectional view parallel to an XZ plane in FIG. 1. The housing 90 stores an electrode group 50, electrolytic solution (not shown), a second separator 42, and a third electrode 30. The positive electrode terminal 81 and the negative electrode terminal 82 go through the lid 92. The positive electrode terminal 81 and the negative electrode terminal 82 are connected with the electrode group 50. The positive electrode terminal 81 and the negative electrode terminal 82 may be electrically insulated from the lid 92 by, for example, a resin gasket.

Figure 3:
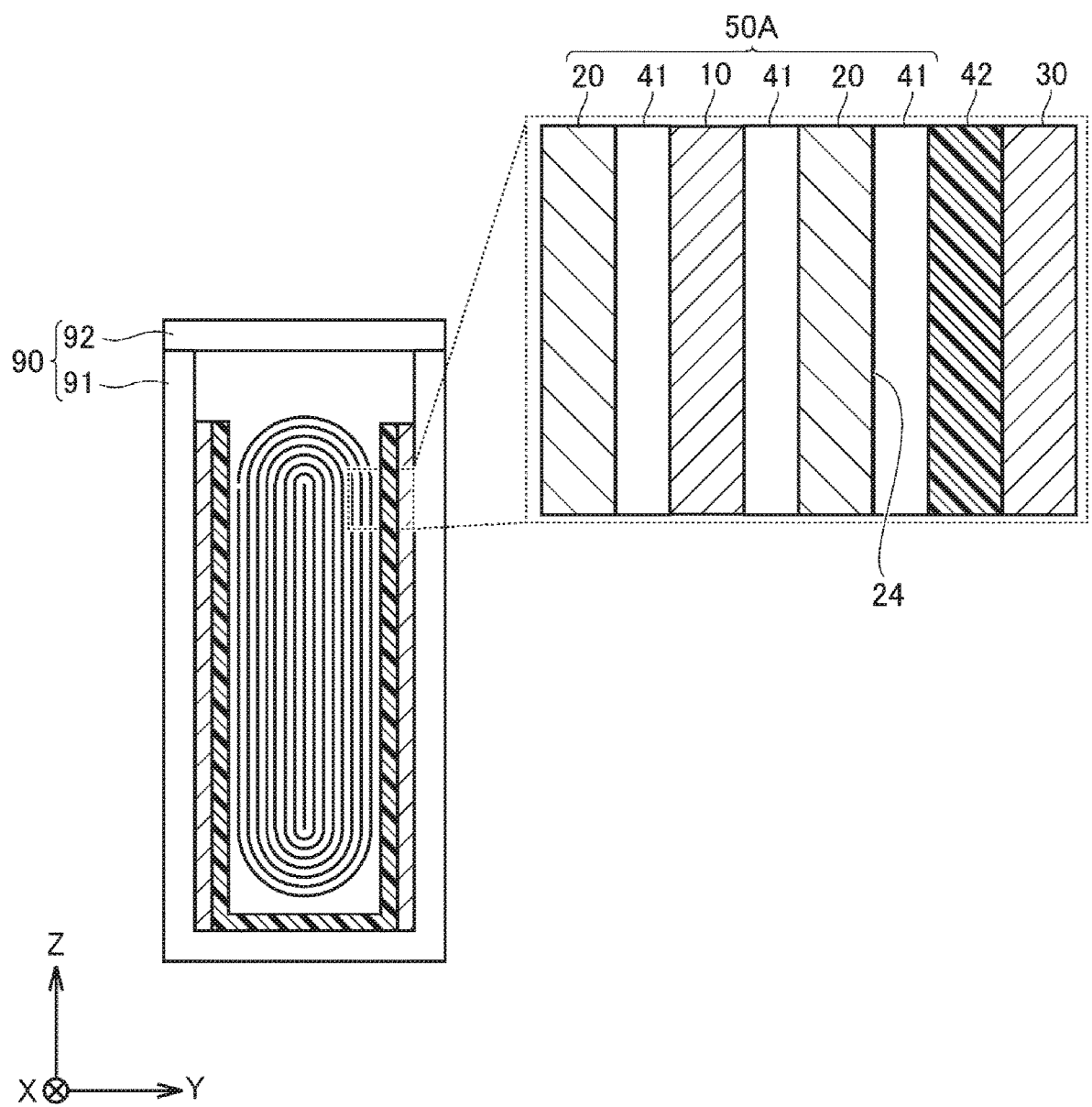
FIG. 3 is an example of a schematic sectional view parallel to an YZ plane in FIG. 1.

<<Electrode group>> The electrode group 50 may be a wound electrode group 50A or a laminated electrode group 50B. FIG. 3 is an example of a schematic sectional view of an YZ plane in FIG. 1. FIG. 3 shows the wound electrode group 50A. The wound electrode group 50A is provided with a positive electrode 10 and a negative electrode 20. A first separator 41 is arranged between the positive electrode 10 and the negative electrode 20. In the wound electrode group 50A, both the positive electrode 10 and negative electrode 20 are belt-shaped sheets. The wound electrode group 50A is structured by winding the positive electrode 10 and the negative electrode 20. The positive electrode 10 and the negative electrode 20 are wound so that the negative electrode 20 is wound on the outer periphery side of the positive electrode 10. The positive electrode 10 faces the negative electrode 20. The negative electrode 20 has a non-facing region 24 that does not face the positive electrode 10. The non-facing region 24 is arranged on the outermost periphery of the wound electrode group 50A. A third electrode 30 is arranged so as to face the non-facing region 24. The second separator 42 is arranged between the wound electrode group 50A and the third electrode 30.

Figure 4:
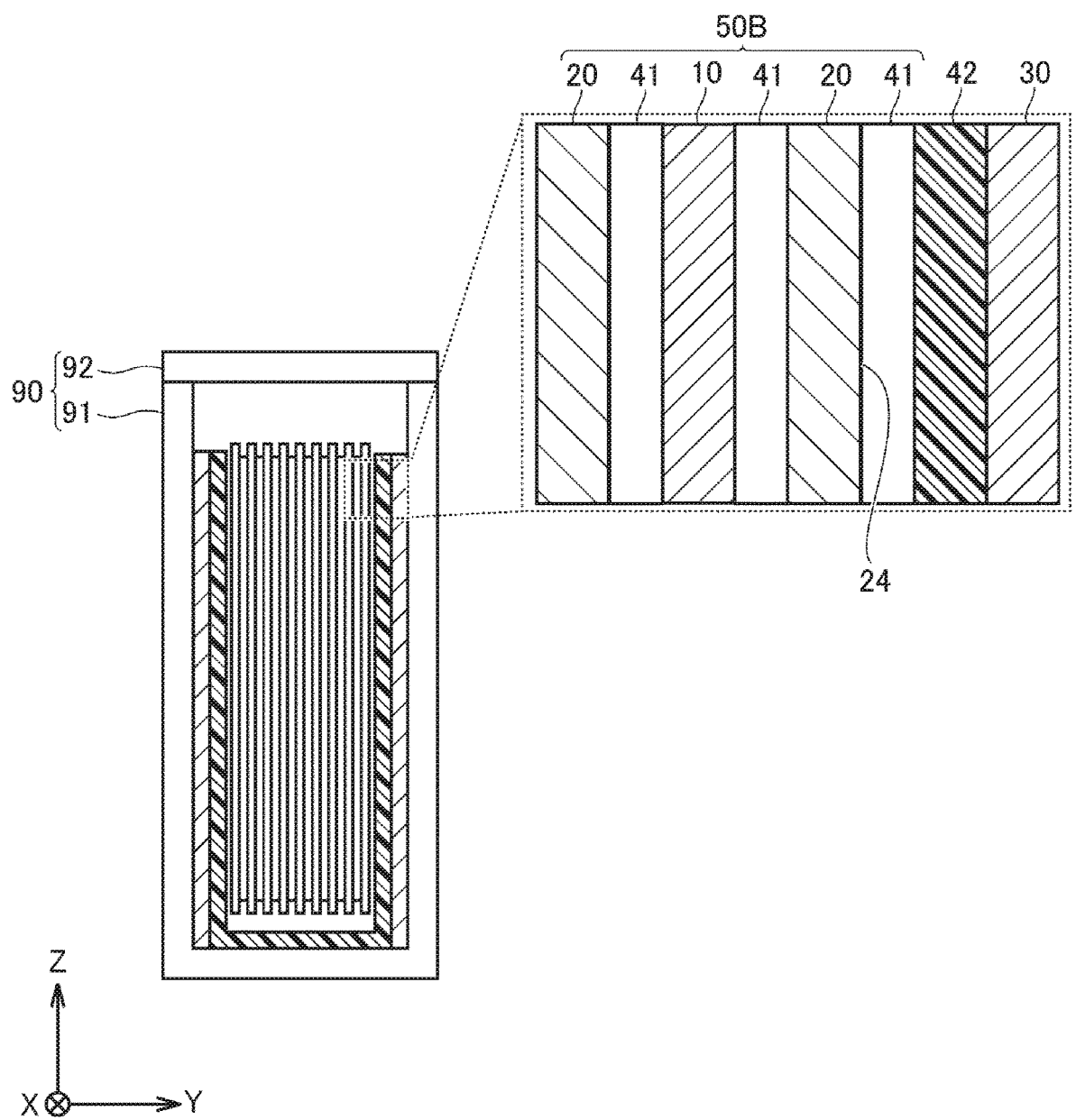
FIG. 4 is another example of the schematic sectional view parallel to the YZ plane in FIG. 1.

FIG. 4 is another example of the schematic sectional view parallel to the YZ plane in FIG. 1. FIG. 4 shows the laminated electrode group 50B. In the laminated electrode group 50B, a positive electrode 10 and a negative electrode 20 are rectangular sheets. The laminated electrode group 50B includes the plurality of positive electrodes 10 and negative electrodes 20. The laminated electrode group 50B is structured by laminating the positive electrode 10 and the negative electrode 20 alternatively. The positive electrode 10 faces the negative electrode 20. The negative electrode 20 has a non-facing region 24 that does not face the positive electrode 10. The non-facing region 24 is arranged on the outermost layer of the laminated electrode group 50B. A third electrode 30 is arranged so as to face the non-facing region 24. A second separator 42 is arranged between the laminated electrode group 50B and the third electrode 30.

Figure 5:
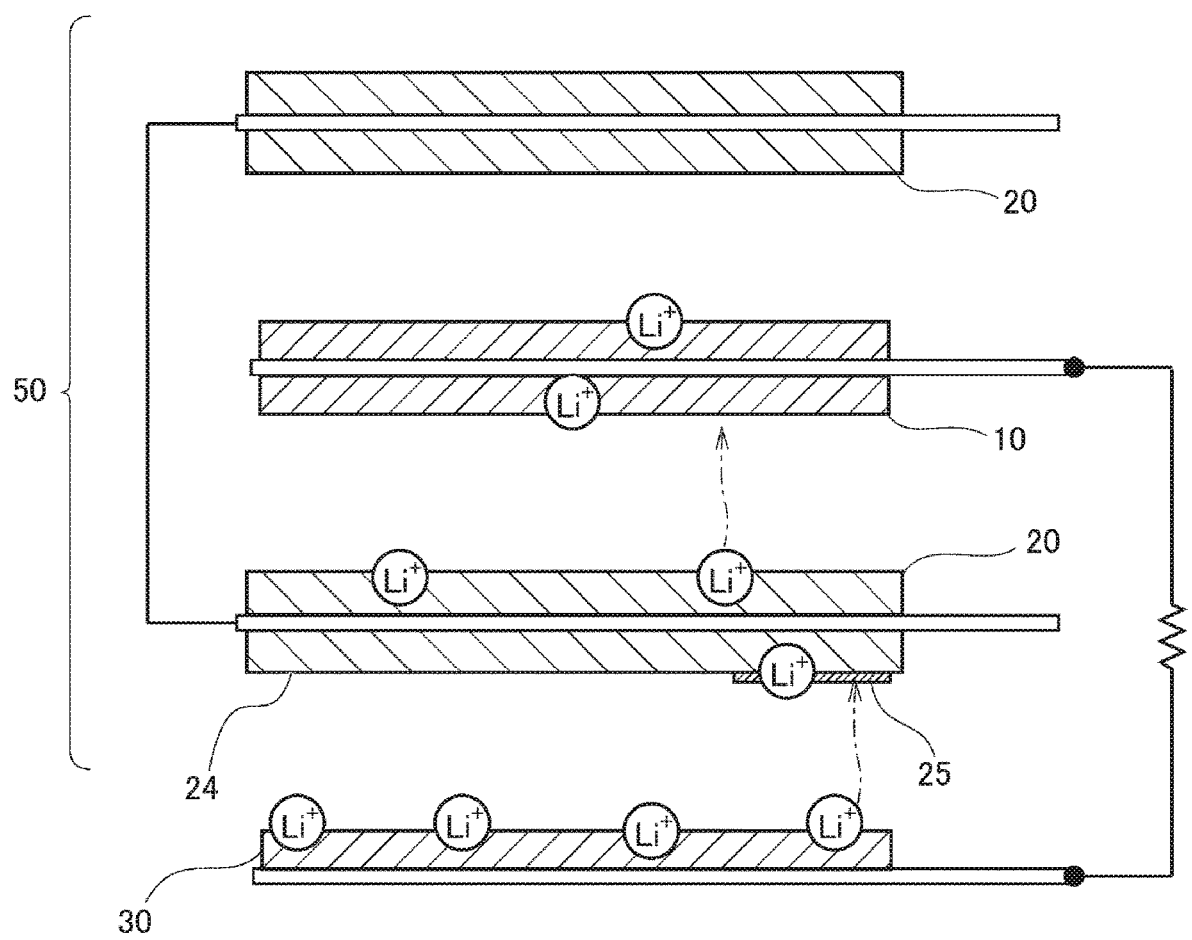
FIG. 5 is a first conceptual view for explaining recovery processing.

<<Recovery processing>> Recovery processing of the battery 100 is explained. FIG. 5 is a first conceptual view for explaining the recovery processing. The positive electrode 10 faces the negative electrode 20. The negative electrode 20 has the non-facing region 24 that does not face the positive electrode 10. The third electrode 30 is arranged to face the non-facing region 24. Ordinary charging and discharging are carried out between the positive electrode 10 and the negative electrode 20. The non-facing region 24 (a part of the negative electrode 20) is not used during ordinary charging and discharging.

The recovery processing is performed by utilizing a potential difference generated between the positive electrode 10 and the third electrode 30. First of all, due to charging between the positive electrode 10 and the negative electrode 20, the positive electrode 10 and the negative electrode 20 are charged to a given SOC. Thereafter, as the positive electrode 10 and the third electrode 30 are electrically connected with each other, the recovery processing begins. The SOC at the start of the recovery processing should not be particularly limited. However, the higher the SOC is, the larger the amount of lithium-ion becomes, which contributes to the recovery processing. This is because a potential difference between the positive electrode 10 and the third electrode 30 becomes large. In the recovery processing, first of all, lithium ion is supplied to the non-facing region 24 from the third electrode 30. Then, lithium ion is supplied to the positive electrode 10 from the negative electrode 20.

When lithium ion is supplied to the non-facing region 24 for the first time, a part of the supplied lithium-ion is consumed for forming a film 25. Therefore, it is considered that efficiency of supplying lithium ion from the third electrode 30 to the positive electrode 10 is reduced.

Figure 6:
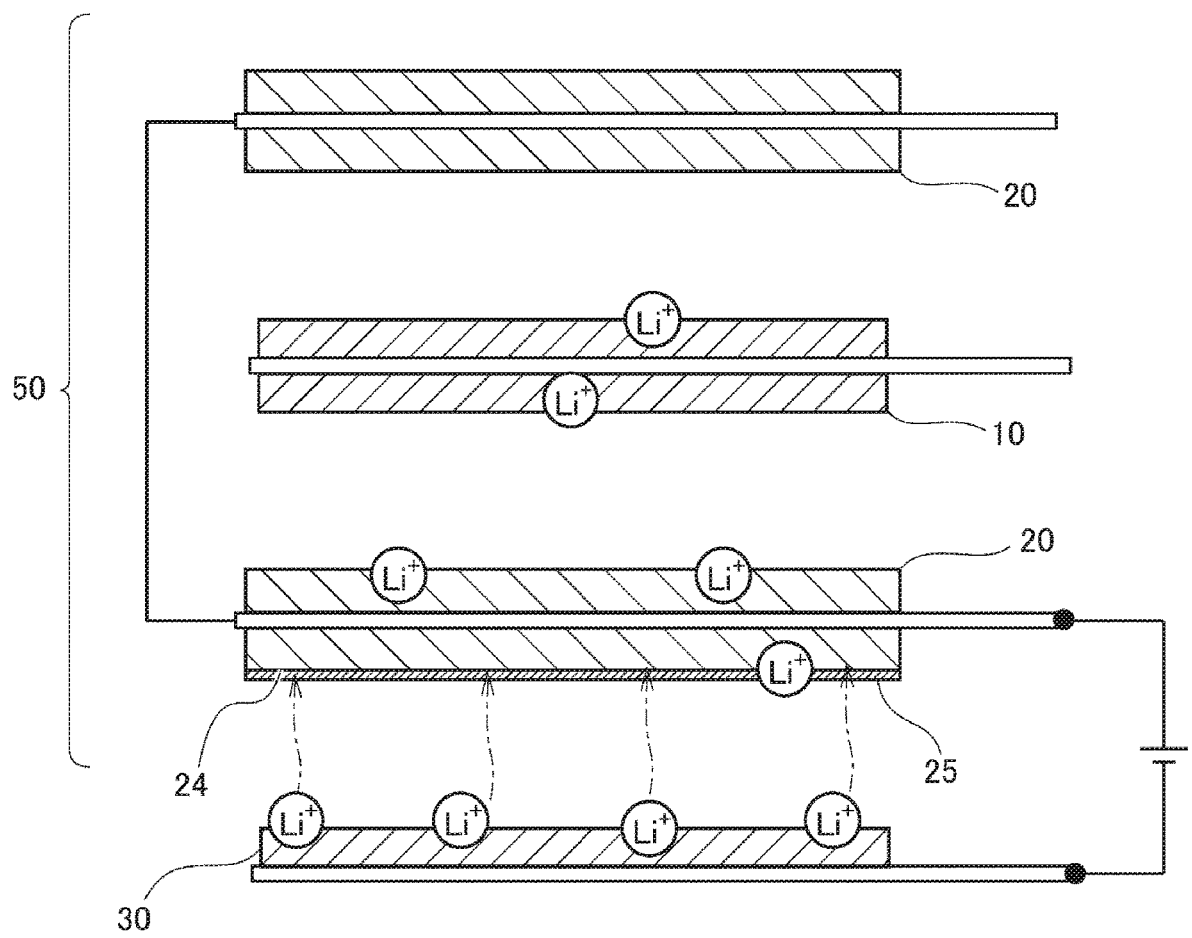
FIG. 6 is a conceptual view for explaining a production method for a lithium-ion secondary battery according to the embodiment.

FIG. 6 is a conceptual view for explaining a production method for a lithium-ion secondary battery according to this embodiment. In the production method according to this embodiment, after the battery 100 is assembled, charging and discharging are carried out between the third electrode 30 and the negative electrode 20 before use of the battery 100 begins. Thus, the film 25 is formed in the non-facing region 24 in advance, and a given irreversible capacity is generated.

Figure 7:
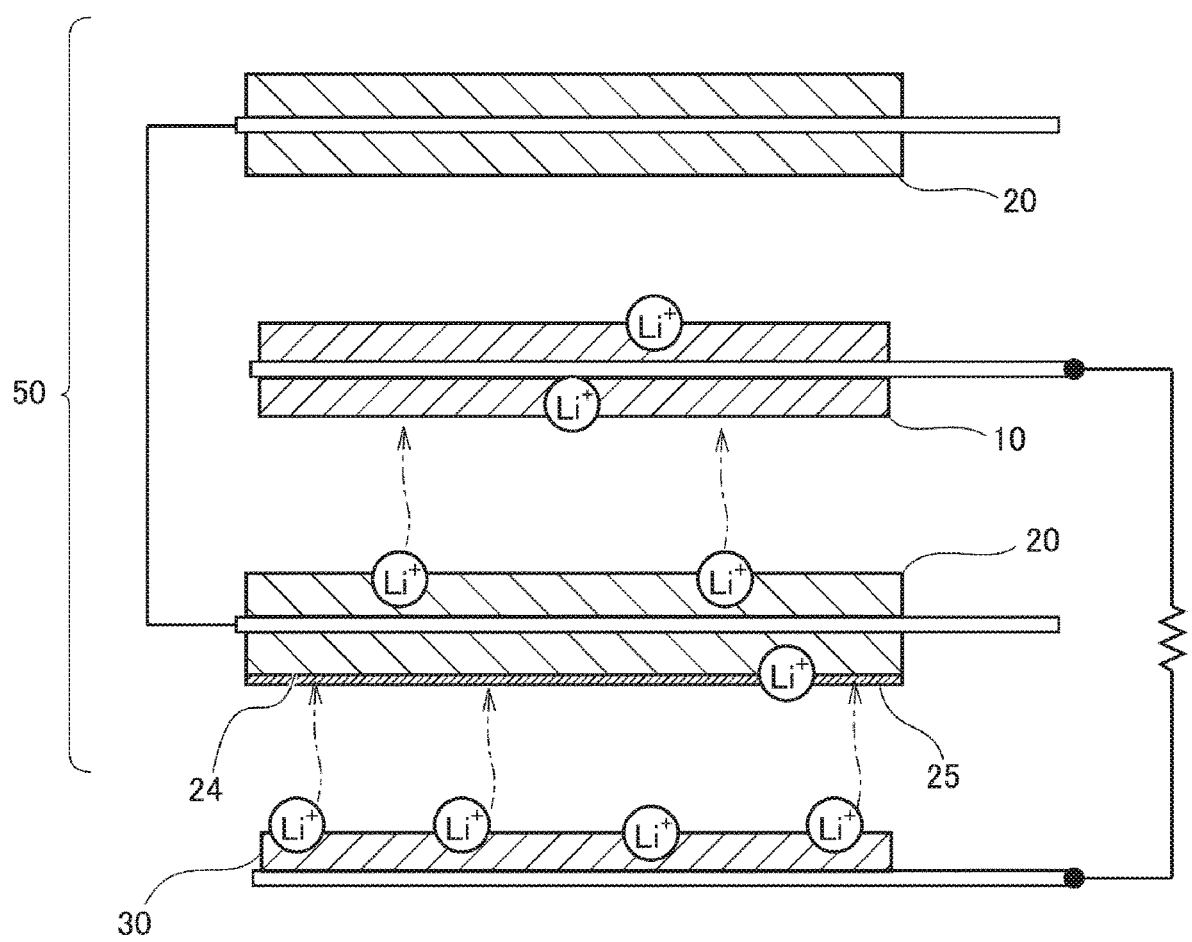
FIG. 7 is a second conceptual view for explaining the recovery processing.

FIG. 7 is a second conceptual view for explaining the recovery processing. As stated above, the recovery processing is carried out by electrically connecting the positive electrode 10 and the third electrode 30 with each other. In the battery 100, which is produced by using the production method for a lithium-ion secondary battery according to this embodiment, the film 25 is already formed. Therefore, the recovery processing (supply of lithium-ion) proceeds without forming of the film 25. Therefore, it is considered that time required for the recovery processing is shortened.

Figure 8:
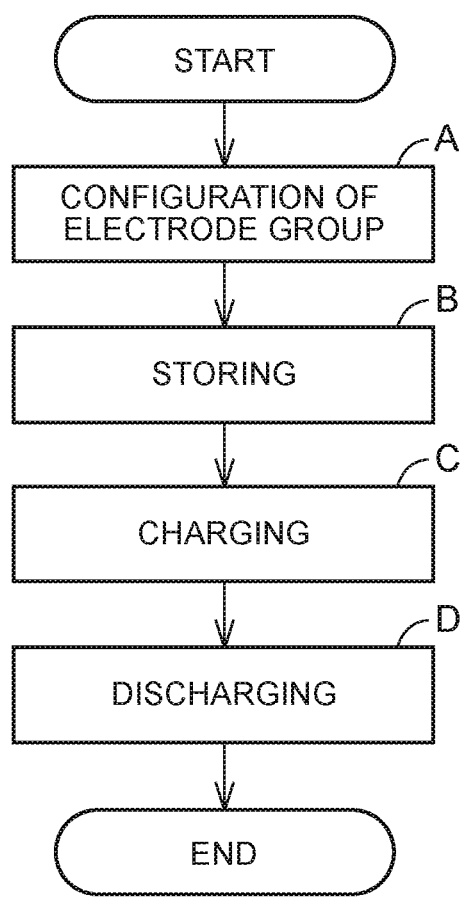
FIG. 8 is a flowchart showing an outline of the production method for a lithium-ion secondary battery according to the embodiment of the disclosure.

<Production method for a lithium-ion secondary battery> Hereinafter, the production method for a lithium-ion secondary battery according to this embodiment is explained. FIG. 8 is a flowchart showing an outline of the production method for a lithium-ion secondary battery according to this embodiment. The production method according to this embodiment includes (A) configuring an electrode group, (B) storing, (C) charging, and (D) discharging.

<<(A) Configuring an electrode group>> The production method according to this embodiment includes (A) configuring the electrode group 50 that includes the positive electrode 10 and the negative electrode 20.

Figure 9:
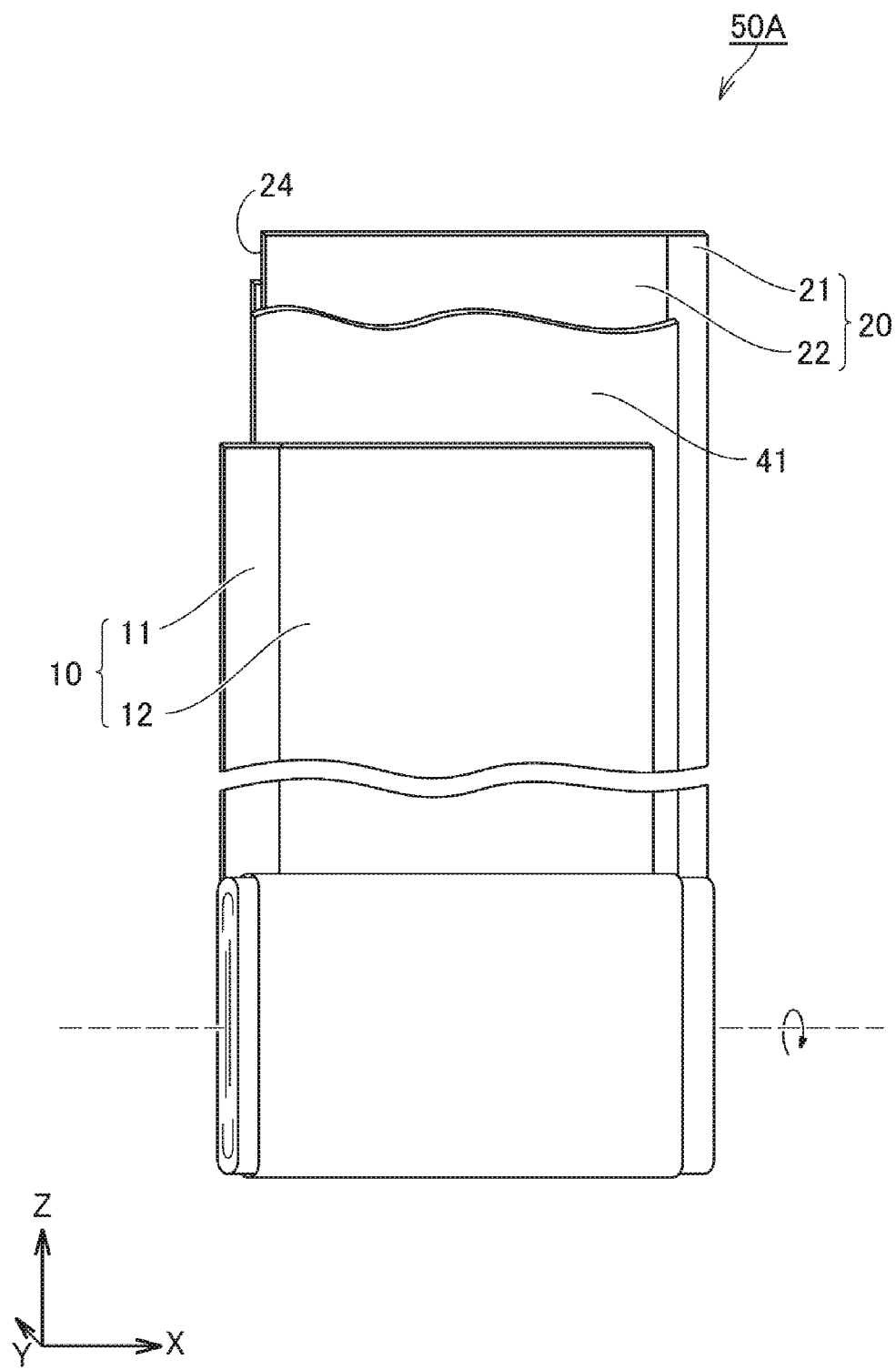
FIG. 9 is a schematic view of an example of a configuration of a wound electrode group.

(Wound electrode group) FIG. 9 is a schematic view of an example of a configuration of the wound electrode group. The belt-shaped positive electrode 10 and the belt-shaped negative electrode 20 are laminated so that the positive electrode 10 and the negative electrode 20 face each other through the belt-shaped first separator 41. Further, the belt-shaped positive electrode 10 and the belt-shaped negative electrode 20 are wound, thereby configuring the wound electrode group 50A. The belt-shaped negative electrode 20 is wound so as to encompass the outer periphery side of the belt-shaped positive electrode 10 with respect to a winding axis. Thus, the negative electrode 20 is arranged on the outermost periphery of the wound electrode group 50A. The negative electrode 20 arranged on the outermost periphery is provided with the non-facing region 24 that does not face the positive electrode 10.

After winding, the wound electrode group 50A may be formed into a flat shape. In both ends of the wound electrode group 50A in the winding axis direction (the X axis direction in FIG. 9), the positive electrode current collector 11 and the negative electrode current collector 21 are exposed in an alternate manner. The exposed positive electrode current collector 11 is connected with the positive electrode terminal 81 later. The exposed negative electrode current collector 21 is connected with the negative electrode terminal 82 later.

Figure 10:
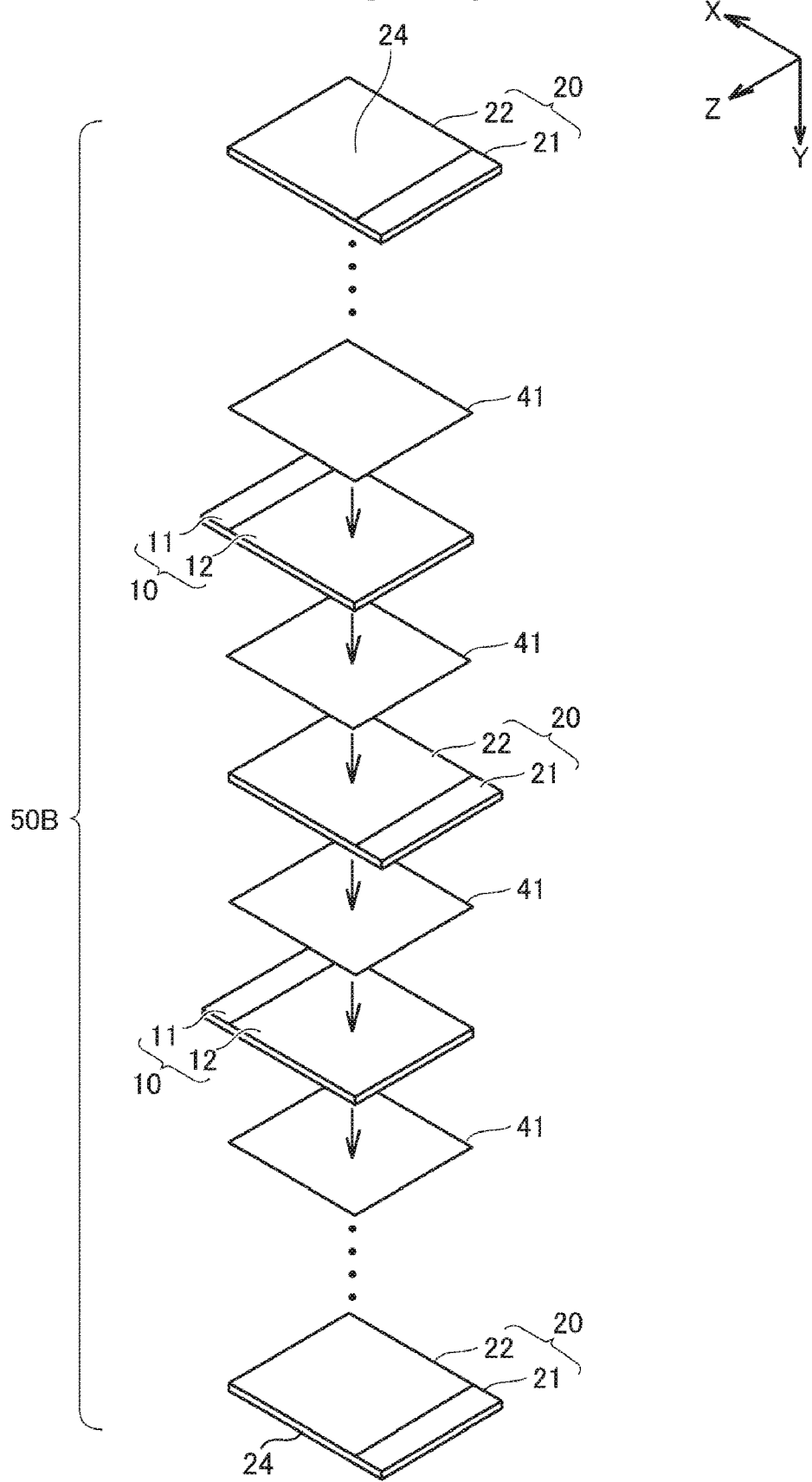
FIG. 10 is a schematic view of an example of a configuration of a laminated electrode group.

(Laminated electrode group) FIG. 10 is a schematic view of an example of a configuration of the laminated electrode group. The laminated electrode group 50B is structured by alternately laminating the rectangular positive electrode 10 and the rectangular negative electrode 20. The rectangular first separator 41 is arranged between the rectangular positive electrode 10 and the rectangular negative electrode 20. Each of these members may be adhered to each other by, for example, a binder such as polyvinylidene fluoride (PVdF). The negative electrode 20 is arranged on the outermost layer of the laminated electrode group 50B. The negative electrode 20 arranged on the outermost layer includes the non-facing region 24 that does not face the positive electrode 10.

In both ends of the positive electrode 10 and the negative electrode 20 in a direction intersecting the laminating direction (the X axis direction in FIG. 10), a positive electrode current collector 11 and a negative electrode current collector 21 are exposed in an alternate manner. The exposed positive electrode current collector 11 is connected with the positive electrode terminal 81 later. The exposed negative electrode current collector 21 is connected with the negative electrode terminal 82 later.

(Positive electrode) It is possible to prepare the positive electrode 10 by using a method of a related technology. For example, first, positive electrode slurry containing a positive electrode active material is prepared. The positive electrode slurry is applied on a surface of the positive electrode current collector 11 and dried, thereby forming a positive electrode active material layer 12. Thus, the positive electrode 10 is produced. The positive electrode 10 is processed into a given dimension to conform to a specification of the electrode group 50. This processing includes rolling and cutting. For example, in a case where the positive electrode 10 is for the wound electrode group 50A, the positive electrode 10 is cut into a belt shape. In the case where the positive electrode 10 is for the laminated electrode group 50B, the positive electrode 10 is cut into a rectangular shape.

The positive electrode current collector 11 may be, for example, Al foil. The Al foil may be made of pure Al foil or Al alloy foil. The positive electrode current collector 11 may have a thickness of, for example, 5~30 μm. The positive electrode slurry is prepared by mixing a positive electrode active material, a conductive material, a binder, a solvent, and so on. To prepare the positive electrode slurry, a general agitational mixing device is used. To apply the positive electrode slurry, a die coater, for example, may be used.

The positive electrode active material is a substance that is able to occlude and release lithium-ion. Typically, the positive electrode active material is in powder form. The positive electrode active material may have an average particle size of, for example, 1~20 μm. An average particle size in this specification shows a cumulative 50% particle size from a fine particle side in a size distribution in volume base, which is measured by using a laser diffraction/scattering method.

The positive electrode active material may be lithium containing metal oxide, lithium containing phosphate and so on. Examples of lithium containing metal oxide include $LiCoO_2$, $LiNiO_2$, $LiMnO_2$, $LiMn_2O_4$, and $LiNi_{1/3}Co_{1/3}Mn_{1/3}O_2$. Examples of lithium containing phosphate include $LiFePO_4$. A single kind of the positive electrode active material may be used alone; a combination of two or more kinds of the positive electrode active material may be used.

The conductive material may be, for example, carbon black such as acetylene black (AB), furnace black, and thermal black, or vapor-grown carbon fiber (VGCF), graphite, and so on. The binder may be, for example, PVdF, polytetrafluoroethylene (PTFE), and polyacrylic acid (PAA). For each of the conductive material and the binder, a single kind may be used or a combination of two or more kinds may be used. The solvent is selected in consideration of dispensability of the binder. For example, when the binder is PVdF, N-methyl-2-pyrrolidone (NMP) can be used as the solvent.

The positive electrode active material layer 12 is rolled so as to have a thickness of, for example, 10~150 μm. For the rolling, for example, a roller rolling machine can be used. The positive electrode active material layer 12 may contain 80~98 mass % of the positive electrode active material, 1~15 mass % of the conductive material, and 1~5 mass % of the binder.

(Negative electrode) It is possible to prepare the negative electrode 20 by using a method of a related technology. For example, first, negative electrode slurry containing a negative electrode active material is prepared. The negative electrode slurry is applied to a surface of the negative electrode current collector 21 and dried, thereby forming a negative electrode active material layer 22. Thus, the negative electrode 20 is produced. The negative electrode 20 is processed into a given dimension to conform to a specification of the electrode group 50. This processing includes rolling and cutting. For example, in the case where the negative electrode 20 is for the wound electrode group 50A, the negative electrode 20 is cut into a belt shape. In the case where the negative electrode 20 is for the laminated electrode group 50B, the negative electrode 20 is cut into a rectangular shape.

The negative electrode current collector 21 may be, for example, copper (Cu) foil. The Cu foil may be pure Cu foil or Cu alloy foil. The negative electrode current collector 21 may have a thickness of, for example, 5~30 μm. The negative electrode slurry is prepared by mixing the negative electrode active material, a binder, a solvent, and so on. To prepare the negative electrode slurry, for example, a general agitation mixing device can be used. To apply the negative electrode slurry, for example, a die coater can be used.

The negative electrode active material is a substance that is able to occlude and release lithium-ion. Typically, the negative electrode active material is in powder form. The negative electrode active material may have an average particle size of, for example, 1~20 μm. The negative electrode active material may be, for example, graphite, graphitizable carbon, non-graphitizable carbon, silicon, silicon oxide, tin, and tin oxide. A single kind of the negative electrode active material may be used alone; a combination of two or more kinds of the negative electrode active material may be used.

The binder may be, for example, carboxymethyl cellulose (CMC), styrene-butadiene rubber (SBR), and PAA. A single kind of the binder may be independently used, or a combination of two or more kinds of the binder may be used. The solvent is selected in consideration of dispensability of the binder. For example, in the case where the binder is CMC and SBR, water can be used as the solvent.

The negative electrode active material layer 22 is rolled to have a thickness of, for example, 10~150 μm. For the rolling, for example, a roller rolling machine can be used. The negative electrode active material layer 22 may contain, for example, 95~99 mass % of the negative electrode active material, and 1~5 mass % of the binder.

(The first separator) The first separator 41 is an electrically insulating porous film. The first separator 41 holds electrolytic solution in vacant spaces inside the first separator 41. For example, the first separator 41 may be made of resin such as polyethylene (PE) and polypropylene (PP). The first separator 41 can be produced by using a method of a related technology. The first separator 41 can be produced by, for example, a stretching-opening method and a phase separation method.

The first separator 41 may have a multilayer structure. For example, the first separator 41 may have three layers of a porous film made of PP, a porous film made of PE, and a porous film made of PP. The porous film made of PP, the porous film made of PE, and the porous film made of PP may be laminated in this order. The first separator 41 may have a heat resistant layer on its surface. For example, the heat resistant layer may be made of a heat resistant material such as alumina.

The first separator 41 may have a thickness of, for example, 5~30 μm. The first separator 41 is cut into a given dimension to confirm to the specification of the electrode group 50. For example, in the case where the first separator 41 is for the wound electrode group 50A, the first separator 41 is cut into a belt shape. In the case where the first separator 41 is for the laminated electrode group 50B, the first separator 41 is cut into a rectangular shape.

<<(B) Storing>> The production method according to this embodiment includes (B) storing the electrode group 50, the electrolytic solution, the second separator 42, and the third electrode 30 in the housing 90.

As shown in FIG. 2, the electrode group 50, the second separator 42, and the third electrode 30 are stored in the case 91. The electrode group 50 is connected with the positive electrode terminal 81 and the negative electrode terminal 82. After the electrode group 50, the second separator 42, and the third electrode 30 are stored in the case 91, the case 91 and the lid 92 are joined to each other.

The electrolytic solution is injected into the housing 90 from, for example, the liquid injection hole provided in the lid 92. This means that the electrolytic solution is stored in the housing 90. The electrode group 50 and the second separator 42 are impregnated with the electrolytic solution injected into the housing 90. After the injection, the liquid injection hole is sealed with, for example, a plug. Thus, the housing 90 is tightly closed.

(Electrolytic solution) The electrolytic solution contains solvent and lithium salt. The electrolytic solution is prepared by dispersing and dissolving lithium salt in the solvent. Lithium salt functions as supporting electrolyte. Lithium salt may be, for example, $LiPF_6$, $LiBF_4$ and $Li[N(FSO_2)_2]$. In the electrolytic solution, concentration of lithium salt may be, for example, 0.5~2.0 mol/l.

The solvent is aprotonic. The solvent may be, for example, a mixture of cyclic carbonate and chain carbonate. A mixture ratio of the cyclic carbonate and chain carbonate may be, for example, "cyclic carbonate:chain carbonate=1: 9~5:5 (volume ratio)". Examples of cyclic carbonate include ethylene carbonate (EC), propylene carbonate (PC), butylene carbonate (BC). Examples of chain carbonate include dimethyl carbonate (DMC), ethyl methyl carbonate (EMC), diethyl carbonate (DEC). For each of cyclic carbonate and chain carbonate, a single kind may be used or a combination of two or more kinds may be used.

The electrolytic solution may also contain a functional additive, in addition to the solvent and lithium salt. The electrolytic solution may contain, for example, 0.1~5 mass % of the functional additive. Examples of the functional additive include vinylene carbonate (VC), lithium bis (oxalate) borate (LiBOB), cyclohexylbenzene (CHB), biphenyl (BP), and lithium difluorophosphate. The electrolytic solution may be gelatinous.

Figure 11:
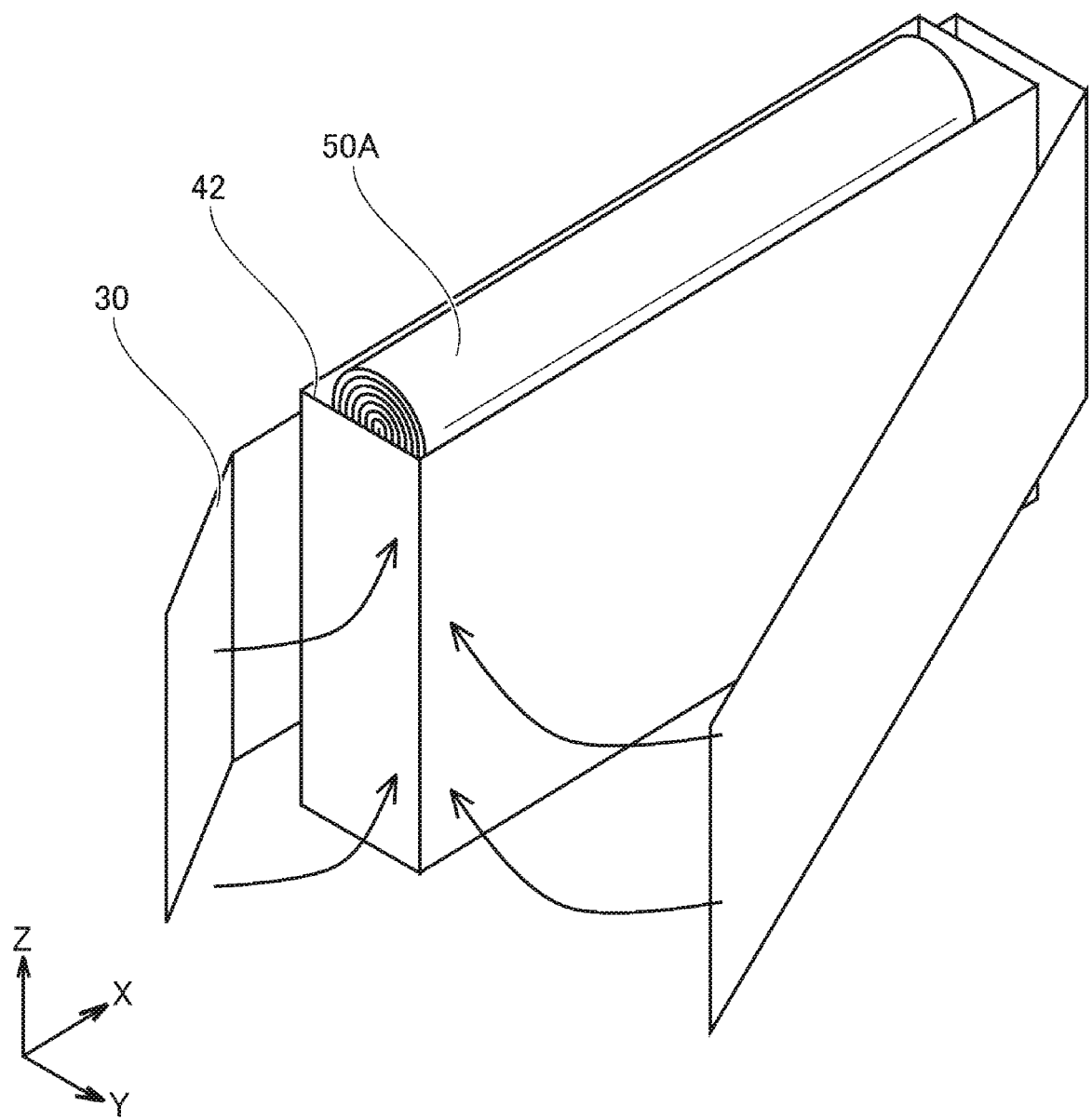
FIG. 11 is a schematic view of an example of arrangement of a third electrode.

(The second separator) FIG. 11 is a schematic view of an example of arrangement of the third electrode. FIG. 11 shows the wound electrode group 50A for convenience sake. In the case of the laminated electrode group 50B, the similar arrangement can be used. The second separator 42 is an electrically insulating porous film. The second separator 42 holds the electrolytic solution in vacant spaces inside the second separator 42. Similarly to the first separator 41, the second separator 42 may be made of, for example, resin such as PE and PP. As shown in FIG. 11, the second separator 42 may have, for example, a bag shape form. The wound electrode group 50A can be stored in the bag-shaped second separator 42.

(The third electrode) As shown in FIG. 11, the third electrode 30 is wound around the wound electrode group 50A, for example, on top of the second separator 42. The non-facing region 24 is arranged on the outermost periphery of the wound electrode group 50A. The third electrode 30 is arranged so as to face at least the non-facing region 24. It is preferred that the third electrode 30 is arranged so as to face the end parts of the positive electrode 10 and the negative electrode 20 in the direction intersecting the laminating direction (the X axis direction in FIG. 11). In end parts of the wound electrode group 50A in the X axis direction, there are gaps among the positive electrode 10, the first separator, and the negative electrode 20. These gaps communicate with inside of the wound electrode group 50A. Therefore, since the third electrode 30 also faces the end parts of the wound electrode group 50A in the X axis direction, lithium ion can be efficiently supplied to inside of the wound electrode group 50A during the recovery processing.

The third electrode 30 includes a third electrode active material layer. The third electrode 30 may include a collector, similarly to the positive electrode 10 and the negative electrode 20. The third electrode active material layer may be formed on a surface of the collector.

The third electrode active material layer contains a third electrode active material. The third electrode active material may be a positive electrode active material or a negative electrode active material, as long as the third electrode active material is able to supply lithium ion. For example, graphite is unsuitable for the third electrode active material since it is not able to supply lithium ion. The third electrode active material may be, for example, lithium containing metal oxide such as $LiCoO_2$, $LiNiO_2$, $LiMnO_2$, $LiMn_2O_4$, $LiNi_{1/3}Co_{1/3}Mn_{1/3}O_2$, and $Li_4Ti_5O_{12}$, lithium containing phosphate such as $LiFePO_4$, lithium metal, lithium-aluminum alloy, and so on. In the case where the third electrode active material is conductive and has a suitable form for an electrode, there are instances where a collector is unnecessary. For example, lithium metal foil and lithium-aluminum alloy foil themselves can serve as the third electrode 30.

In this embodiment, it is preferred that the third electrode active material is the same positive electrode active material as the positive electrode active material contained in the positive electrode active material layer 12 because the number of parts is reduced. It is more preferred that the third electrode active material layer has the same composition as that of the positive electrode active material layer 12 because it is not necessary to prepare another positive electrode slurry for the third electrode 30.

In the case where the third electrode active material layer contains the positive electrode active material, the collector may be, for example, an Al plate, and Al foil. The Al plate may be a pure Al plate or an Al alloy plate. For example, the positive electrode slurry is prepared using the same procedure as that of the positive electrode 10. The positive electrode slurry is applied on a surface (one side) of the Al plate and dried, thereby forming the third electrode active material layer. Thus, it is possible to produce the third electrode 30. The collector of the third electrode 30 may be foamed metal, metal mesh, and so on.

It is preferred that the third electrode 30 is produced so as to have a capacity that is equal to or larger than the sum of an irreversible capacity from the initial charging and discharging, and a capacity used for the recovery processing. For example, it is preferred that a charge and discharge capacity of the third electrode 30 per unit area is at least twice as large as a charge and discharge capacity of the positive electrode 10 per unit area. This means that, when the positive electrode 10 has a first charge and discharge capacity per unit area, and the third electrode 30 has a second charge and discharge capacity per unit area, it is preferred that the second charge and discharge capacity is at least twice as large as the first charge and discharge capacity.

The second charge and discharge capacity may be ten times or less, five times or less, four times or less, or three times or less the first charge and discharge capacity. It is possible to adjust the first charge and discharge capacity by, for example, a composition of the positive electrode active material layer 12, a mass of the positive electrode active material layer 12 per unit area, and so on. It is possible to adjust the second charge and discharge capacity by, for example, a composition of the third electrode active material layer, a mass of the third electrode active material layer per unit area, and so on.

Similarly to the positive electrode 10 and the negative electrode 20, the third electrode 30 may be taken outside the housing 90 by an external terminal. In the case where the housing 90 is made of metal, the third electrode 30 may be conducted with the housing 90. In the case where the third electrode 30 is conductive with the housing 90, the housing 90 functions as the external terminal of the third electrode 30. However, the positive electrode terminal 81 and the negative electrode terminal 82 need to be electrically insulated from the housing 90. The third electrode 30 may be welded to the housing 90. As long as the third electrode 30 and the housing 90 are conducted with each other, the third electrode 30 may only need to be in contact with the housing 90.

In the case where the housing 90 is made of metal, the third electrode 30 may be directly formed on an inner wall of the housing 90. For example, it is possible to form the third electrode 30 directly on the inner wall of the housing 90 by using the following method. The case 91 is filled with the positive electrode slurry. The case 91 filled with the positive electrode slurry is heated for 30 minutes or so in a warm bath in which temperature is set to about 60° C. The positive electrode slurry is discharged from the case 91. The case 91 is dried for 10 minutes or so in a hot air dryer in which temperature is set to about 120° C. In this way, the third electrode 30 is formed on the inner wall of the case 91 (the housing 90). In this form, the housing 90 functions as both the collector and the external terminal.

<<(C) Charging>> The production method according to this embodiment includes (C) charging the negative electrode 20 by performing charging between the third electrode 30 and the negative electrode 20 inside the housing 90.

For (C) charging and later described (D) discharging, it is possible to use a general charge and discharge device. The negative electrode 20 and the third electrode 30 are connected with each other through the charge and discharge device. For example, the negative electrode terminal 82, and the case 91, which also functions as the external terminal of the third electrode 30, are connected with the charge and discharge device. The charge and discharge device carries out charging with a given current rate for a given period of time. Thus, lithium ion is supplied to the negative electrode 20 (the non-facing region 24) from the third electrode 30, thereby forming the film 25.

In this embodiment, it is preferred that a capacity equivalent to SOC of 40% or larger but not exceeding 60% is charged in the negative electrode 20. It is considered that, by charging a capacity equivalent to SOC of 40% or more in the negative electrode 20, the film 25 is formed sufficiently, and generation of an irreversible capacity is suppressed thereafter. A capacity equivalent to SOC exceeding 60% may be charged in the negative electrode 20. However, in a range where SOC exceeds 60%, an amount of the film 25 formed is small. Therefore, even if a capacity equivalent to SOC exceeding 60% is charged in the negative electrode 20, it is considered that an effect of shortening time for the recovery processing does not improve so much. In this embodiment, it is more preferred that a capacity equivalent to SOC of 45% or more but not exceeding 55% is charged in the negative electrode 20.

In this specification, a current rate, with which SOC of a lithium-ion secondary battery reaches 100% from 0% in an hour-long charging, is defined as "1 C". In this embodiment, it is preferred that the negative electrode 20 is charged with a current rate of 1 C or larger but not exceeding 2 C. When a current rate during charging exceeds 2 C, charging takes only a short period of time. However, a level of uniformity of the film 25 can be lowered. When the level of uniformity of the film 25 is lowered, the film 25 can be formed (loss of lithium-ion can happen) again in a portion where the film 25 is not sufficiently formed during the recovery processing. When a current rate during charging is less than 1 C, it is considered that uniformity of the film 25 improves. However, processing time becomes long, which is considered inefficient. In this embodiment, it is more preferred that the negative electrode 20 is charged with a current rate of 1.2 C or larger but not exceeding 1.8 C.

<<(D) Discharging>> The production method according to this embodiment includes (D) discharging the charged negative electrode 20 by discharging between the third electrode 30 and the negative electrode 20, thereby producing the battery 100 (lithium-ion secondary battery).

After the charging, the charge and discharge device carries out discharging for a given period of time with a given current rate. Thus, a part of lithium ion supplied to the negative electrode 20 is returned to the third electrode 30. Since there is the irreversible capacity due to forming of the film 25, lithium ion that is able to return to the third electrode 30 is considered to be about 80~99% of the lithium ion supplied to the negative electrode 20.

In this embodiment, it is preferred that the negative electrode 20 is discharged at a current rate of 1 C or larger but not exceeding 2 C. It is desirable that lithium ion, other than lithium ion used to form the film 25, is returned to the third electrode 30 as much as possible. It is considered that lithium ion remaining in the negative electrode 20 could cause voltage defect and so on. When a current rate during discharging exceeds 2 C, an amount of lithium ion that is able to return to the third electrode 30 could be reduced. When a current rate during discharging is smaller than 1 C, processing time becomes longer, which is considered inefficient.

There may be given standing time between (C) charging and (D) discharging. The standing time is, for example, between a minute and an hour. (C) Charging and (D) discharging may be carried out more than once. This means that a charge and discharge cycle may be carried out. However, in the second or subsequent charging and discharging, an amount of the film 25 formed (an amount of the irreversible capacity generated) is decreased suddenly. Therefore, even if charging and discharging are repeated, it is considered that an effect of shortening time for the recovery processing does not improve drastically.

According to the forgoing, the battery 100 is produced. As stated above, in the battery 100, the film 25 is formed in the non-facing region 24. Therefore, when the recovery processing is carried out after a capacity of the battery 100 is reduced, a loss of lithium ion due to forming of the film 25 is small. Therefore, it is considered that time required for the recovery processing is shortened.

<<Use of the lithium-ion secondary battery>> A lithium-ion secondary battery produced by using the production method according to this embodiment is suitable for a use that requires a long life for several years. As an example of this kind of use, there is a power supply for a hybrid vehicle (HV), a plug-in hybrid vehicle (PHV), an electric vehicle (EV), and so on. However, a use of the lithium-ion secondary battery according to this embodiment should not be limited to such an on-vehicle use. It is possible to apply the lithium-ion secondary battery according to this embodiment to various uses.

Hereinafter, an example is explained. However, the following example does not limit the scope of the disclosed disclosure.

EXAMPLE

As stated below, a lithium-ion secondary battery was produced, which is structured so as to operate in a voltage area of 3.0~4.1 V. This lithium-ion secondary battery has a rated capacity of 5 Ah.

<<(A) Configuring an electrode group>> The following materials were prepared: $LiNi_{1/3}Co_{1/3}Mn_{1/3}O_2$ (hereinafter, abbreviated as "NCM") as a positive electrode active material; acetylene black (AB) as a conductive material; PVdF as a binder; NMP as a solvent; and Al foil as a positive electrode current collector.

By mixing NCM, AB, PVdF, and NMP, positive electrode slurry was prepared. A composition of NCM, AB, and PVdF was "NCM:AB:PVdF=93:4:3 (mass ratio)". The positive electrode slurry was applied on surfaces (both front and back surfaces) of the Al foil and dried. Thus, a positive electrode was fabricated. This positive electrode includes a positive electrode active material layer and a positive electrode current collector. The positive electrode was rolled and cut. In this way, the belt-shaped positive electrode was prepared.

The following materials were prepared: graphite as a negative electrode active material; CMC and SBR as a binder; water as a solvent; Cu foil as a negative electrode current collector.

By mixing graphite, CMC, SBR and water, negative electrode slurry was prepared. A composition of graphite, CMC, and SBR is "graphite:CMC:SBR=98:1:1 (mass ratio)". The negative electrode slurry was applied on surfaces (both front and back surfaces) of the Cu foil and dried. Thus, a negative electrode was fabricated. This negative electrode includes a negative electrode active material layer and a negative electrode current collector. The negative electrode was rolled and cut. In this way, a belt-shaped negative electrode was prepared.

As a first separator, two belt-shaped porous films were prepared. The porous film was made of PE. The positive electrode, the first separator, the negative electrode, and the first separator were laminated in this order. Further, by winding them, a wound electrode group was made. This means that the electrode group having a positive electrode and a negative electrode was made. The negative electrode was wound so as to encompass the outer periphery side of the positive electrode with respect to the winding axis. In this wound electrode group, the negative electrode was arranged on the outermost periphery. The negative electrode arranged on the outermost periphery had a non-facing region that did not face the positive electrode. The wound electrode group was formed into a flat shape.

<<(B) Storing>> The positive electrode slurry prepared as stated above was applied on a surface (one side) of a belt-shaped Al plate and dried. Thus, a third electrode was fabricated. The third electrode was rolled to have a given thickness. This third electrode included a third electrode active material layer and a third electrode collector (Al plate). The third electrode active material layer contained a third electrode active material (NCM). The third electrode active material layer had the same composition as that of the positive electrode active material layer of the positive electrode.

The mass of the third electrode active material layer per unit area was set to be twice as large as the mass of the positive electrode active material layer per unit area. This means that, when a charge and discharge capacity of the positive electrode per unit area is the first charge and discharge capacity, and a charge and discharge capacity of the third electrode per unit area is the second charge and discharge capacity, the second charge and discharge capacity is twice as large as the first charge and discharge capacity.

A housing having a case and a lid was prepared. The lid included a liquid injection hole, a positive electrode terminal, and a negative electrode terminal. The positive electrode terminal and the negative electrode were electrically insulated from the lid. The positive electrode terminal and the negative electrode terminal were welded to the electrode group. As a second separator, a bag made of a porous film was prepared. The bag was made of PE. The bag also had an opening. The wound electrode group was inserted into the bag from the opening. Further, the third electrode was wound around the bag. The wound electrode group, the second separator (bag), and the third electrode were inserted into the case. The third electrode was arranged so as to face the non-facing region (the negative electrode). Also, the third electrode was arranged so that the third electrode collector comes into contact with an inner wall of the case. This means that the third electrode was arranged so as to allow conduction between the third electrode and the housing. The case and the lid were joined to each other by laser welding.

Electrolytic solution containing the following components was prepared: $LiPF_6$ (1.1 mol/l) as lithium salt; and [EC:DMC:EMC=3:4:3 (volume ratio)] as a solvent. The electrolytic solution was injected into the housing from the liquid injection hole of the lid. The liquid injection hole was sealed by a plug. As the result of the foregoing, the electrode group, the electrolytic solution, and the third electrode were stored in the housing.

<<(C) Charging>> A charge and discharge device was prepared. The negative electrode terminal and the housing were connected with the charge and discharge device. This means that the negative electrode and the third electrode were connected with the charge and discharge device. As charging was performed between the third electrode and negative electrode, the negative electrode was charged. The charging was performed with a current rate of 1.5 C. The charging was performed so that a capacity equivalent to SOC of 50% was charged in the negative electrode.

<<(D) Discharging>> After the charging, by performing discharging between the third electrode and the negative electrode, the charged negative electrode was discharged. The discharging was carried out with a current rate of 1.5 C. The discharging was performed until a potential difference between the third electrode and the negative electrode reached 3.0V. As a result of the foregoing, a lithium-ion secondary battery according to the example was produced.

Comparative Example

A lithium-ion secondary battery according to a comparative example was produced by using the same production method as that of the example except that above-mentioned (C) charging and (D) discharging were not included.

<Evaluation> <<Measurement of recovery rates>> In each of the lithium-ion secondary batteries, SOC was adjusted to 100%. The positive electrode terminal and the housing were connected with each other by lead wire. This means that the positive electrode and the third electrode were electrically connected with each other. An ammeter was used to measure current flowing through the lead wire. A recovery rate was calculated by dividing capacity supplied to the electrode group from the third electrode by a rated capacity of the battery.

Figure 12:
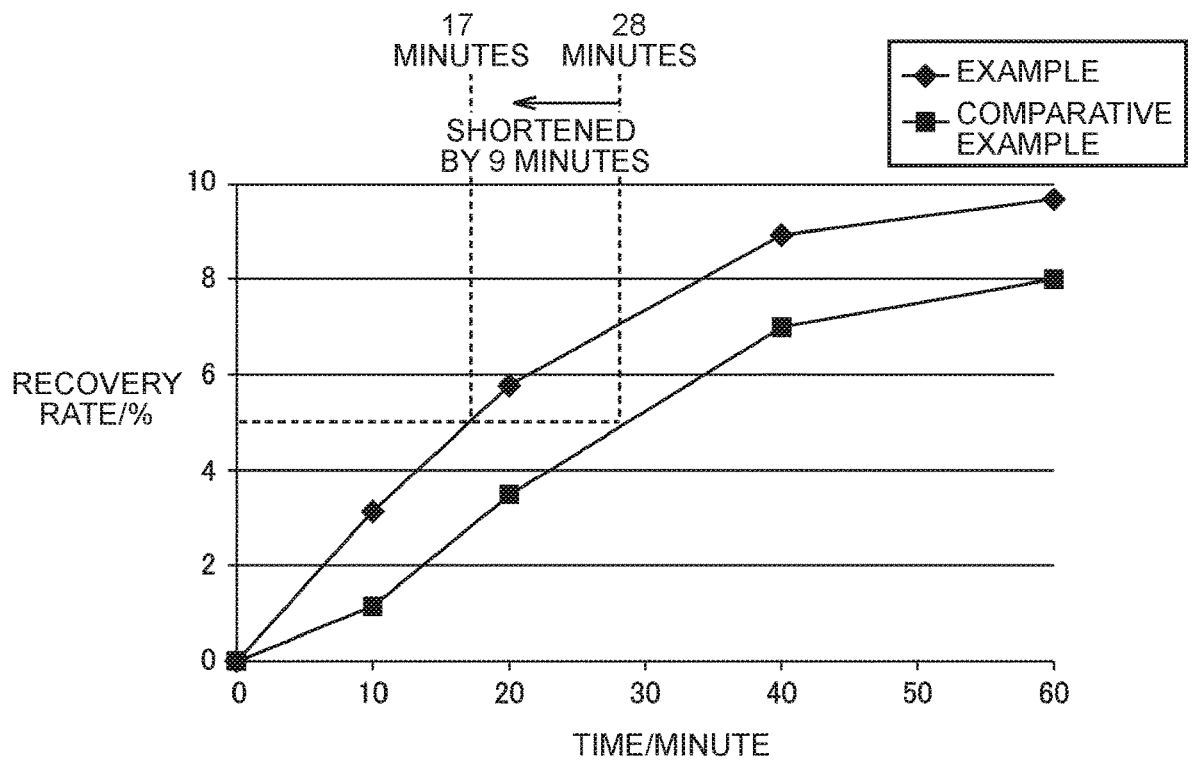
FIG. 12 is a graph showing a relation between recovery rate and time in the recovery processing.

FIG. 12 is a graph showing a relation between the recovery rate and time during the recovery processing. As shown in FIG. 12, a rate of increase of the recovery rate is higher in the example than the comparative example. In the example, time required until the recovery rate reaches 5% is shortened by as long as nine minutes compared to the comparative example. This is considered because, in the example, the film is formed in the non-facing region in advance because of the foregoing (C) charging and (D) discharging.

<<Measurement of charge and discharge efficiency>> In the lithium-ion secondary battery according to the example, charging and discharging were repeated five times between the third electrode and the negative electrode. Each time the charging and discharging were carried out, charge and discharge efficiency was calculated by dividing a discharge capacity by a charge capacity.

Figure 13:
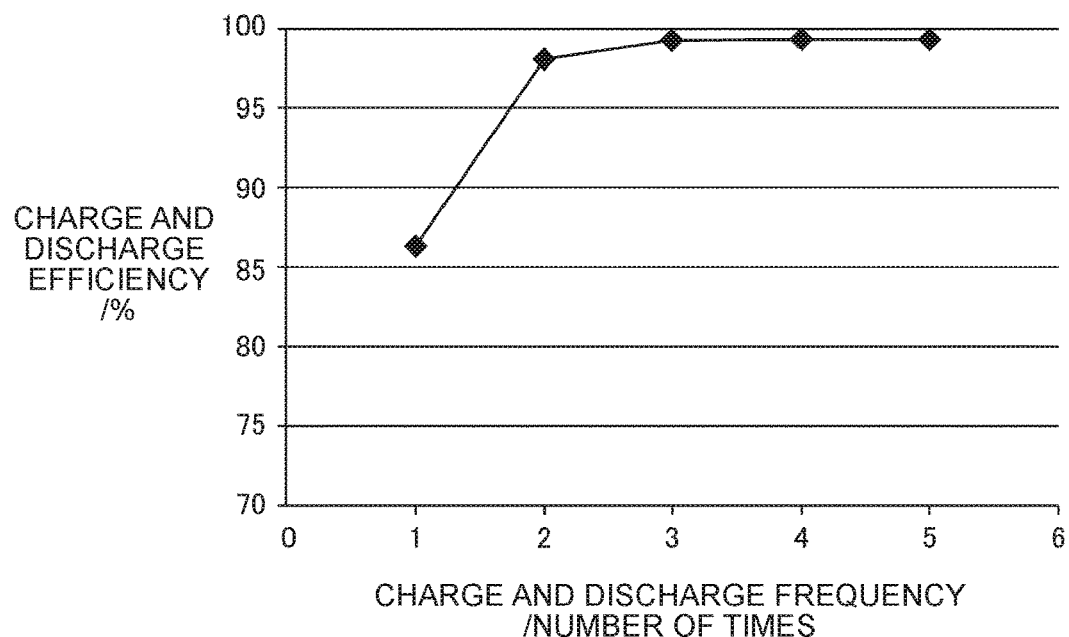
FIG. 13 is a graph showing a relation between charge and discharge frequency and charge and discharge efficiency.

FIG. 13 is a graph showing a relation between charge and discharge frequency and the charge and discharge efficiency. As shown in FIG. 13, the charge and discharge efficiency increased suddenly at the second charging and discharging. At the second or subsequent charging and discharging, the charge and discharge efficiency does not change so much. This is considered because, at the second or subsequent charging and discharging, an amount of the film formed is small. Therefore, it is considered that (C) charging and (D) discharging are necessary at least only once.

It should be understood that the embodiment and the example disclosed here are described merely as examples in all respects and are not restrictive. It is intended that the scope of the disclosure in this disclosure is defined by the scope of claims, not by the foregoing explanation, and includes all the changes within the equivalent meaning and scope to the scope of claims.

What is claimed is:

1. A production method for a lithium-ion secondary battery comprising:
    assembling a wound electrode group provided with a positive electrode and a negative electrode, wherein the positive electrode faces the negative electrode in the electrode group, the negative electrode is provided with a non-facing region that does not face the positive electrode, and the non-facing region is on an outermost periphery of the wound electrode group;
    storing the electrode group, an electrolytic solution, and a third electrode in a housing, wherein the third electrode is a lithium-ion supplying electrode, and the third electrode is arranged so as to face the non-facing region of the negative electrode;
    charging the negative electrode by performing charging between the third electrode and the negative electrode inside the housing, thereby forming a film in the non-facing region of the negative electrode during the production method; and
    discharging the charged negative electrode by performing discharging between the third electrode and the negative electrode, wherein
    during the production method, the charging and discharging do not include supplying power from outside of the lithium-ion secondary battery to the third electrode, and
    the positive electrode and the negative electrode are configured to perform charging and discharging of the lithium-ion secondary battery.

2. The production method for the lithium-ion secondary battery according to claim 1, wherein
    the positive electrode has a first charge and discharge capacity per unit area,
    the third electrode has a second charge and discharge capacity per unit area, and
    the second charge and discharge capacity per unit area is at least twice as large as the first charge and discharge capacity per unit area.

3. The production method for the lithium-ion secondary battery according to claim 1, wherein a current rate, with which a state of charge of the lithium-ion secondary battery reaches 100% from 0% in an hour-long charging, is defined as 1 C, the negative electrode is charged with a current rate of 1 C or larger but not exceeding 2 C, and the negative electrode is discharged with a current rate of 1 C or larger but not exceeding 2 C.

4. The production method for the lithium-ion secondary battery according to claim 1, wherein,
in the lithium-ion secondary battery, a capacity equivalent to a state of charge of 40% or larger but not exceeding 60% is charged in the negative electrode.

5. The production method for the lithium-ion secondary battery according to claim 1, wherein lithium ions are supplied from the third electrode to the non-facing region of the negative electrode, and lithium ions are supplied from the negative electrode to the positive electrode.

6. A production method for a lithium-ion secondary battery comprising:
assembling a wound electrode group provided with a positive electrode and a negative electrode, wherein the positive electrode faces the negative electrode in the electrode group, the negative electrode is provided with a non-facing region that does not face the positive electrode, and the non-facing region is on an outermost periphery of the wound electrode group;
storing the electrode group, an electrolytic solution, and a third electrode in a housing, wherein the third electrode is a lithium-ion supplying electrode, and the third electrode is arranged so as to face the non-facing region of the negative electrode;
performing charging between the positive electrode and the negative electrode; and
electrically connecting the positive electrode and the third electrode to begin recovery processing and generate a potential difference between the positive electrode and the third electrode, thereby forming a film in the non-facing region of the negative electrode during the production method, wherein
during the production method, the recovery processing does not include supplying power from outside of the lithium-ion secondary battery to the third electrode, and
the positive electrode and the negative electrode are configured to perform charging and discharging of the lithium-ion secondary battery.

7. The production method for the lithium-ion secondary battery according to claim 6, wherein the electrically connecting the positive electrode and the third electrode occurs after a capacity of the lithium-ion secondary battery has been reduced.

8. The production method for the lithium-ion secondary battery according to claim 6, wherein during the recovery processing lithium ions are supplied from the third electrode to the non-facing region of the negative electrode, and lithium ions are supplied from the negative electrode to the positive electrode.

* * * * *